United States Patent Office 3,687,776
Patented Aug. 29, 1972

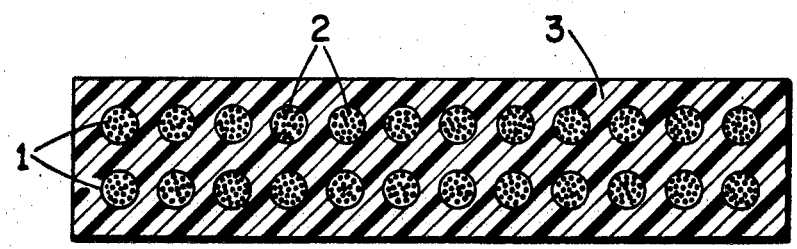

3,687,776
PROCESS FOR MAKING A HEAT RESISTANT REINFORCED LAMINATE
Pierre Allard, Hameau de Treve-Oray-Cailloux-sur-Fontaines, and Victor Dumas, Sainte-Foy-les-Lyon, France, assignors to Société Rhodiaceta, Paris, France
Filed Nov. 24, 1969, Ser. No. 879,245
Claims priority, application France, Nov. 25, 1968, 175,206
Int. Cl. C09j 5/06
U.S. Cl. 156—306
3 Claims

ABSTRACT OF THE DISCLOSURE

Laminated materials comprising at least one reinforcing layer produced from a mechanically-stable and heat-resistant yarn, impregnated with a heat-stable resin are flexible and heat-resistant and have a high resistance to delamination. They are made by forming an assembly of one or more layers of reinforcing yarns associated with a textile fabric constituted by a solid heat-stable polymer composition, which when heated passes through a transient liquid phase, and heating the assembly to a temperature and for a time sufficient to liquefy the polymer composition.

---

The present invention relates to laminated material and to a process for its production.

The general procedure for manufacturing laminated material is to stack several layers of woven fabric, called "plies," often made of glass yarns, impregnated with an appropriate resin (either in a fusible form or in solution or dispersion) and to cause the assembly to cohere by the action of heat, and where appropriate, pressure. This treatment brings about simultaneously the curing or cross-linking of the resin and the removal of any solvent or dispersion medium. The materials obtained possess excellent mechanical properties, such as high tensile modulus and high flexural modulus, and are very light.

For certain applications, in which it is useful for the material to be able to withstand elevated temperatures for long periods of time without significant deterioration, it has been proposed to impregnate the various plies with a heat-resistant and heat-stable resin as defined below dissolved or dispersed in an appropriate medium. The products thus obtained lack flexibility and although they possess a high resistance to delamination (separation of the elementary plies), this is considered insufficient to outweigh the disadvantages inherent in their inflexibility especially when the plies are of a tight textile construction.

It is an aim of the present invention to provide a laminated material which has good flexibility and resistance to delamination, and usually also good resistance to heat.

In one aspect the invention consists in laminated material comprising at least one reinforcing layer produced from mechanically-stable and heat-resistant multi-filament yarns (as hereinafter defined) impregnated with a heat-stable resin (as hereinafter defined) to a degree such that the resin completely surrounds the yarns of the reinforcing layer but does not penetrate between their individual constituent filaments.

The invention is illustrated in the accompanying drawing in which the figure is a cross-sectional view of a laminate of the invention. This laminate comprises layers of reinforcing yarns 1 made up of elementary filaments 2 and impregnated with a heat-stable resin 3 which surrounds the layers and the individual yarns in the layers, but not the individual filaments in the yarns.

Any yarns of sufficient mechanical strength and heat-resistance may be used in the reinforcing layer including those produced from inorganic material such as quartz, metal, glass, boron, or carbon fibres, or organic materials such as aromatic polyamides, polyimides, polyamide-imides or pyrolysed acrylic fibres. The yarns can be in the form of, for example, knitted, woven or non-woven fabrics, and may themselves be long (i.e. of indefinite length) or in relatively short lengths, e.g. of staple length.

If desired the reinforcing layer may contain electrically conductive fibres such as copper wire.

As has been stated the invention is particularly valuable in connection with impregnating resins of the heat-stable i.e. heat-resistant type; more precisely resins which do not undergo significant decomposition after prolonged heating to 200° C. or after short heating to 500° C. Suitable resins include aromatic polyamides, polyimides, polyamide-imides and the like.

The laminate material may be produced by a process which comprises forming an assembly of one or more layers comprising the reinforcing yarns associated with a solid heat-stable polymer composition, which when heated passes through a transient liquid phase, and heating the assembly to a temperature and for a time sufficient to liquefy the polymer composition. In particular the assembly may be heated under pressure. Suitable compositions comprising heat-stable polymers are known, and some examples are given herein; in any case the suitability or otherwise of any particular polymer composition will be obvious to, or readily determined by, any one skilled in this art.

The heat-stable polymer composition may comprise, besides the polymer itself, sufficient of a volatile solvent therefor to cause it to liquify when heated. It has been established that this solvent content should be 0.5 to 50% by weight, preferably 2 to 20% by weight. Advantageously, unstretched yarns obtained by the known technique of simple dry extrusion spinning of a polymer solution, with partial removal of the solvent, are used.

In a practical embodiment of this invention, layers of woven, knitted or non-woven fabric of the heat-stable polymer compositions described above are stacked, preferably alternately with the layers of the reinforcing yarns to form the assembly.

The assembly so produced is hot-pressed, under temperature and pressure conditions which depend on the material used. Under the combined influence of the heat and the pressure, the heat-stable polymer composition, which is initially in the form of a yarn, first passes through a transient liquid state and the liquid mass thus obtained travels across the interstices of the reinforcing fabric and then hardens as the residual solvent is removed, thus providing the bond between the plies. The laminated materials prepared in this way can possess a high proportion of heat-stable resin while still remaining flexible. It is important that the reinforcing fabric should not have too tight a textile construction, which would prevent the resin travelling from one ply to the next.

In another method, yarns based on the solvent-containing heat-stable polymer composition, is associated, in a single fabric, with the heat-resistant mechanically-stable yarn intended to form the reinforcing layer e.g. by wrapping or twisting the yarns about one another and then weaving or knitting the resulting yarn, or by simple juxtaposition, for example alternating the yarns when weaving or knitting. The resulting fabrics are then stacked and the laminated material is made by applying heat and optionally pressure.

Combinations of the above two methods can also be used, as can combinations of either or both with a known impregnation technique.

The resin content can be varied across the laminate by significantly increasing the resin content in the external layers by covering the assembly with a fabric consisting only of the solvent-containing polymer yarns.

The laminated materials of the invention are characterised by good flexibility and excellent resistance to delamination combined with good mechanical properties, such as high tensile strength. Since it is possible to make materials with a very high heat-stable resin content, they show particularly good resistance to abrasion. Furthermore, this material can be in three-dimensional shapes, and thus it is possible easily to produce the final desired shape. All these properties allow the laminated materials to be used successfully in numerous applications, including rocket cones, randomes, complex bodywork of articles intended to be exposed to heat and various electrical articles, e.g. solenoids.

The following examples illustrate the invention.

EXAMPLE 1

A solution in N-methyl-pyrrolidone-2 of a polyamide-imide obtained by the process described in French patent specification No. 1,498,015 is formed into a yarn of continuous unstretched filaments by dry extrusion spinning in a known manner. This yarn has the following characteristics:

Number of filaments _____ 60.
Filament gauge _____ 12 denier (13 dtex).
Residual solvent content (by weight) _____ 15%.

Circular knitted strips, weighing about 500 g./m.$^2$, are produced from this yarn. A woven fabric made of glass yarns and weighing about 330 g./m.$^2$, having a thickness of 30/100 (0.3 mm.) and comprising 5 picks per cm. in the weft and 6 ends per cm. in the warp is placed in contact with each of these strips.

Seven woven fabric-knitted fabric complexes are stacked and the assembly is placed between the two heating platens of a press, heated for ten minutes to 300° C. under a pressure of 1 bar and then for forty-five minutes at the same temperature under a pressure of 15 bars, and cooled for five minutes under a pressure of 15 bars.

In the laminated material released from the mould the yarns of the textile reinforcement are completely surrounded by the heat-stable resin but there is no significant penetration of the resin between the elementary filaments of the yarn. This material, which has an average thickness of 3.5 mm., is particularly flexible for this type of product and has good resistance to delamination.

EXAMPLE 2

The yarn of Example 1, based on polyamide-imide containing 15% of solvent is used. This yarn is doubled on a conventional twisting/doubling device, with a 700 denier (780 dtex) silicone yarn at a doubling twist of 40 turns/metre. A circular knitted strip weighing about 720 g./m.$^2$ is produced with this doubled yarn.

Working under the temperature and pressure conditions described in Example 1, a laminated material which is resistant to delamination and shows remarkable flexibility is obtained.

EXAMPLE 3

Four complexes of knitted fabric (prepared as in Example 1) and metallic fabric (Tyler 60 mesh, aperture 0.246 mm., yarn diameter 0.162 mm.) are stacked and the assembly is placed between two heating platens of a press and subjected to the same conditions as described in Example 1. A flexible laminated material weighing 4,250 g./m.$^2$ of average thickness 1.4 mm. and containing about 24% of resin, is obtained.

EXAMPLE 4

A complex is produced from four knitted fabrics (prepared as in Example 1) and four woven fabrics made of acrylic fibres which have been pyrolysed at a low temperature (300° C.).

A flexible laminated material weighing 1,100 g./m.$^2$, of average thickness 1.4 mm., and containing about 72.5% of resin, is released from the mould.

EXAMPLE 5

A bare single strand copper wire is wrapped with the doubled yarn of Example 2. The assembly is wound on a mandrel under high tension so that the turns touch and the whole is passed into an oven. After cooling, a solenoid, in which the copper wire is perfectly insulated is obtained.

We claim:
1. A process for making a heat resistant reinforced laminate having improved flexibility which comprises assembling at least one layer of a mechanically stable and heat resistant multi-filament yarn and a resinous textile fabric containing a volatile solvent therefor, heating the resulting assembly until the resinous fabric is liquified by the solvent and flows around the yarn, and evaporating the solvent to form a heat stable solid resin surrounding the yarn before substantial penetration thereby of the filaments of the yarn.

2. The process of claim 1 wherein the resinous fabric contains 0.5% to 50% by weight of solvent.

3. The process of claim 2 wherein the resinous fabric contains 2% to 20% by weight of solvent.

References Cited
UNITED STATES PATENTS

| | | | |
|---|---|---|---|
| 3,226,275 | 12/1965 | Kiess | 156—178 X |
| 3,239,401 | 3/1966 | Beery | 156—306 X |
| 3,444,025 | 5/1969 | Hillas | 156—178 X |
| 3,535,180 | 10/1970 | Gasaway | 156—181 X |
| 3,408,239 | 10/1968 | Wedin | 156—178 X |
| 2,944,993 | 7/1960 | Brebner et al. | 156—331 UX |

REUBEN EPSTEIN, Primary Examiner

U.S. Cl. X.R.

156—178, 181; 160—88